(12) United States Patent
Ringwald

(10) Patent No.: US 12,300,835 B2
(45) Date of Patent: May 13, 2025

(54) BATTERY CARRIER

(71) Applicant: HONEYWELL INTERNATIONAL INC., Charlotte, NC (US)

(72) Inventor: Steven Ringwald, Philomath, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 129 days.

(21) Appl. No.: 17/766,491

(22) PCT Filed: Oct. 1, 2020

(86) PCT No.: PCT/US2020/053705
§ 371 (c)(1),
(2) Date: Apr. 4, 2022

(87) PCT Pub. No.: WO2021/067543
PCT Pub. Date: Apr. 8, 2021

(65) Prior Publication Data
US 2024/0055712 A1    Feb. 15, 2024

Related U.S. Application Data

(60) Provisional application No. 62/909,433, filed on Oct. 2, 2019.

(51) Int. Cl.
*H01M 50/244* (2021.01)
*E05B 63/08* (2006.01)
(Continued)

(52) U.S. Cl.
CPC ... *H01M 50/213* (2021.01); *E05B 2047/0058* (2013.01); *E05B 63/08* (2013.01)

(58) Field of Classification Search
CPC . H01M 50/213; H01M 2220/30; E05B 63/08; E05B 2047/0058; Y02E 60/10
See application file for complete search history.

(56) References Cited

U.S. PATENT DOCUMENTS 4,101,818 A * 7/1978 Kelly, III ............ H01M 50/213
320/125
5,187,026 A * 2/1993 Scrivano ............. H01M 50/213
429/96
(Continued)

FOREIGN PATENT DOCUMENTS

CN    1930351 A *  3/2007  ......... E05B 47/0615
CN  205004366 U *  1/2016  ............. Y02E 60/10
(Continued)

OTHER PUBLICATIONS

International Preliminary Report on Patentability for International Patent Application No. PCT/US2020/053705 dated Apr. 14, 2022.
(Continued)

*Primary Examiner* — Kaity V Chandler
(74) *Attorney, Agent, or Firm* — Seager, Tufte & Wickhem, LLP

(57) ABSTRACT

A battery carrier according to an example of the present disclosure includes an elongated body having opposing first and second walls that extend longitudinally between a first end portion and a second end portion of the elongated body. A handle extends outwards from the first end portion. First and second sloped walls extend between the first and second end portions and at least partially define respective battery recesses. Each sloped wall is sloped inwardly from a respective side of the first wall to the second wall.

20 Claims, 7 Drawing Sheets

(51) Int. Cl.
*H01M 50/213* (2021.01)
*H01M 50/262* (2021.01)
*E05B 47/00* (2006.01)

(56) References Cited

U.S. PATENT DOCUMENTS

| | | | |
|---|---|---|---|
| 5,631,098 A | 5/1997 | Suzuki | |
| 6,271,644 B1* | 8/2001 | Okada | H01M 50/588 320/112 |
| 8,047,030 B2 | 11/2011 | Gray | |
| 8,806,907 B2 | 8/2014 | Kalous et al. | |
| 8,889,277 B2 | 11/2014 | Lakamraju et al. | |
| 10,435,916 B2 | 10/2019 | Heisler et al. | |
| 10,465,420 B2 | 11/2019 | Heisler et al. | |
| 10,541,452 B2* | 1/2020 | Cho | H02J 7/0042 |
| 10,900,256 B2 | 1/2021 | Wurm | |
| 10,927,568 B2 | 2/2021 | Singh | |
| 11,255,105 B2 | 2/2022 | Poir et al. | |
| 11,933,076 B2 | 3/2024 | Allen et al. | |
| 2006/0065027 A1 | 3/2006 | Valentine | |
| 2008/0076014 A1 | 3/2008 | Gray | |
| 2009/0104516 A1* | 4/2009 | Yoshihara | H01M 50/503 429/149 |
| 2010/0247994 A1* | 9/2010 | Park | H01M 50/516 429/96 |
| 2011/0097619 A1* | 4/2011 | Park | H01M 10/425 429/159 |
| 2013/0202934 A1* | 8/2013 | Bae | H01M 50/291 429/99 |
| 2013/0316202 A1* | 11/2013 | Bang | H01M 50/569 429/96 |
| 2016/0017640 A1 | 1/2016 | Soloway et al. | |
| 2016/0150660 A1* | 5/2016 | Chitaka | H05K 5/0247 361/752 |
| 2017/0301905 A1* | 10/2017 | Takeda | H01M 50/529 |
| 2019/0058174 A1* | 2/2019 | Nierescher | H01M 10/425 |
| 2019/0280260 A1* | 9/2019 | Shimizu | H01M 50/293 |
| 2024/0392603 A1 | 11/2024 | Di Sario et al. | |

FOREIGN PATENT DOCUMENTS

| | | | | |
|---|---|---|---|---|
| EP | 2525026 A2 | | 11/2012 | |
| EP | 3422303 A1 | | 1/2019 | |
| JP | 2006185824 A | * | 7/2006 | H01M 50/209 |
| JP | 2011021419 A | | 2/2011 | |
| WO | 2013154692 A1 | | 10/2013 | |
| WO | 2016023020 A1 | | 2/2016 | |

OTHER PUBLICATIONS

International Search report and Written Opinion for International Patent Application No. PCT/US2020/053705 dated Dec. 18, 2020.

* cited by examiner

BATTERY CARRIER

CROSS-REFERENCE TO RELATED APPLICATIONS

This application claims the benefit of U.S. Provisional Application No. 62/909,433, filed Oct. 2, 2019, the disclosure of which is incorporated by reference herein in its entirety.

BACKGROUND

The present disclosure relates to battery storage, and more particularly to a battery carrier for inserting and removing batteries from a battery housing, such as one configured to power an electronic mortise lock.

A "mortise" is a recess cut into a part which is designed to receive an insert. A door mortise along an edge of a door is a common type of mortise, and is commonly used to receive a mortise lock for locking and unlocking the door when the door is in a closed position. Electronic locks for doors are known, but have typically located batteries on an exterior of the door, outside of a door mortise.

SUMMARY

A battery carrier according to an example of the present disclosure includes an elongated body having opposing first and second walls that extend longitudinally between a first end portion and a second end portion of the elongated body. A handle extends outwards from the first end portion. First and second sloped walls extend between the first and second end portions and at least partially define respective battery recesses. Each sloped wall is sloped inwardly from a respective side of the first wall to the second wall.

In a further embodiment of any of the foregoing embodiments, the battery carrier includes a battery retention wall disposed at the second end portion that extends outwardly from the second wall in a direction generally perpendicular to a central longitudinal axis of the elongated body.

In a further embodiment of any of the foregoing embodiments, the first and second sloped walls terminate at the battery retention wall.

In a further embodiment of any of the foregoing embodiments, the battery carrier includes a first guide feature that extends outwardly from the first wall, and a second guide feature that extends outwardly from the second wall.

In a further embodiment of any of the foregoing embodiments, the first guide feature includes a ridge that extends outward from the first wall and extends longitudinally between the first end portion and second end portion.

In a further embodiment of any of the foregoing embodiments, the second guide feature includes a tab, and a flexible tongue biases the tab outwardly from the second wall.

In a further embodiment of any of the foregoing embodiments, the second wall includes a plurality of cavities that are coaxial and are disposed between the first end portion and second end portion, and a plurality of support ribs that separate the plurality of cavities.

In a further embodiment of any of the foregoing embodiments, the handle is T-shaped.

In a further embodiment of any of the foregoing embodiments, a radius of curvature of the first and second sloped walls is approximately the same.

In a further embodiment of any of the foregoing embodiments, the first battery recess and second battery recess are each dimensioned to at least partially receive at least one cylindrical battery.

A battery storage system according to an example of the present disclosure includes a battery housing that at least partially defines a cavity that has a first battery storage area and a second battery storage area. A battery carrier is moveable relative to the battery housing between a battery storage position, in which the battery carrier is disposed within the cavity and between the first and second battery storage areas, and a battery removal position in which the battery carrier extends outside of the cavity. The battery carrier includes an elongated body having opposing first and second walls that extend longitudinally between a first end portion and a second end portion of the elongated body. A handle extends outwards from the first end portion. First and second sloped walls extend between the first and second end portions and at least partially define respective battery recesses. Each sloped wall is sloped inwardly from a respective side of the first wall to the second wall.

In a further embodiment of any of the foregoing embodiments, the battery storage system includes a battery retention wall disposed at the second end portion and extending outwardly from the second wall in a direction generally perpendicular to a central longitudinal axis of the elongated body.

In a further embodiment of any of the foregoing embodiments, the first and second sloped walls terminate at the battery retention wall.

In a further embodiment of any of the foregoing embodiments, the battery storage system includes a carrier guide feature of the first wall or second wall that engages a housing guide feature of the housing to support movement of the battery carrier between the battery storage position and the battery removal position.

In a further embodiment of any of the foregoing embodiments, the carrier guide feature includes a ridge that extends outward from the first wall, and the housing guide feature includes a slot that receives the ridge, wherein the ridge is slidable in the slot between the battery storage position and the battery removal position.

In a further embodiment of any of the foregoing embodiments, the carrier guide feature includes a tab, a flexible tongue biasing the tab outwardly from the second wall, and the housing guide feature includes a slot that receives the tab and extends between a first end and a second end. The first end of the slot limits movement of the carrier in the battery removal position.

In a further embodiment of any of the foregoing embodiments, the second wall includes a plurality of cavities that are coaxial and are disposed between the first end portion and second end portion, and a plurality of support ribs separate the plurality of cavities.

In a further embodiment of any of the foregoing embodiments, the handle is T-shaped.

In a further embodiment of any of the foregoing embodiments, a radius of curvature of the each of the sloped walls is approximately the same.

In a further embodiment of any of the foregoing embodiments, the battery storage system includes a hinged door that is rotatable between an open position which enables the battery carrier to advance to the battery removal position, and a closed position that prevents the battery carrier from advancing to the battery removal position.

The embodiments, examples, and alternatives of the preceding paragraphs, the claims, or the following description and drawings, including any of their various aspects or respective individual features, may be taken independently or in any combination. Features described in connection

DETAILED DESCRIPTION

Figure 1:
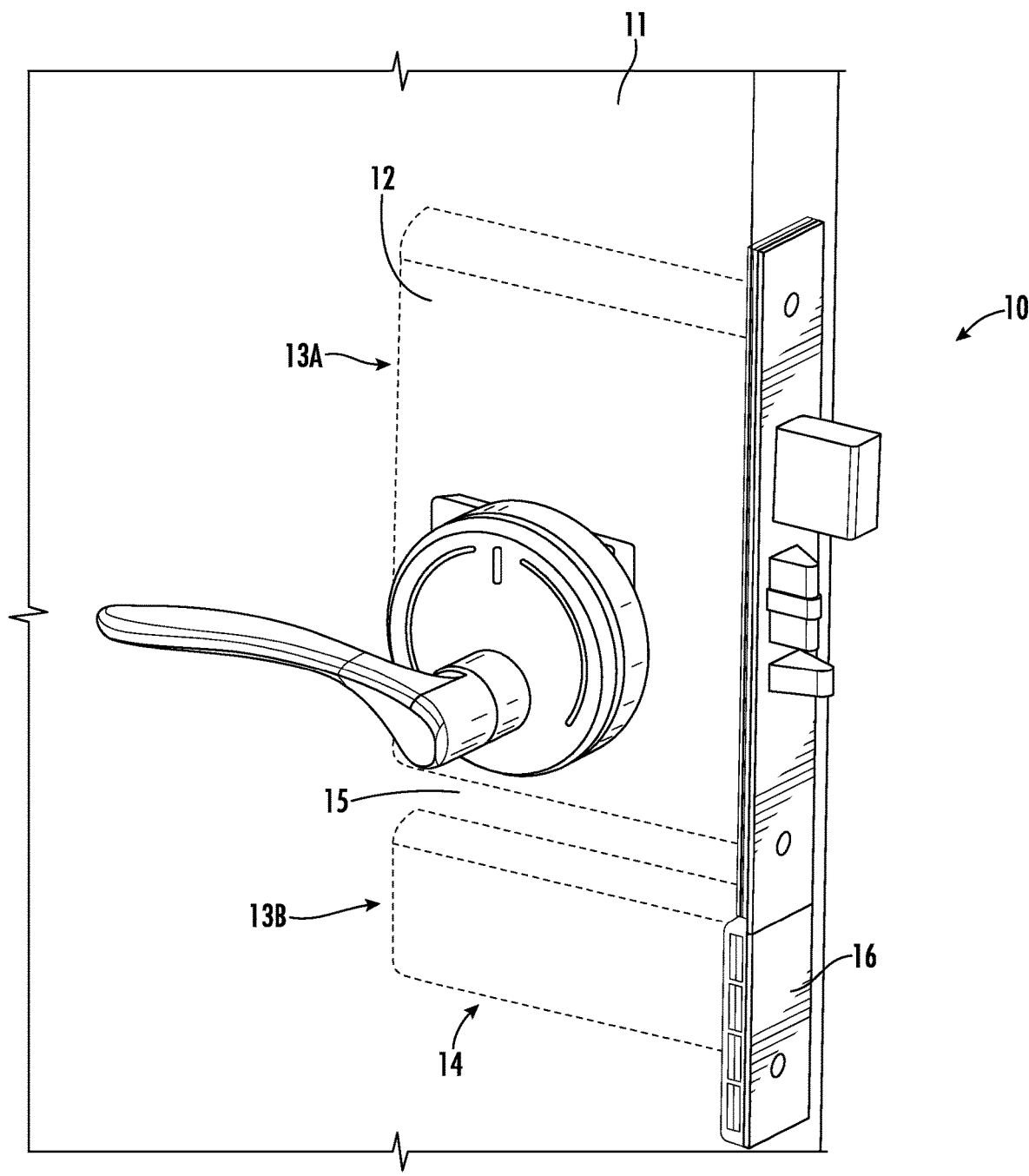
FIG. 1 is a perspective view of an example door lock system.

FIG. 1 is a perspective view of an example door lock system 10 for a door 11. The door lock system 10 includes an electronic mortise lock 12 received into a first door mortise 13A, and a battery storage system 14 that is received into a second door mortise 13B. The battery storage system 14 includes batteries configured to power the electronic mortise lock 12. A rib 15 is provided between the two door mortises 13A-B to provide structural support. An access door 16 is removable to provide access to the battery storage system 14.

Figure 2:
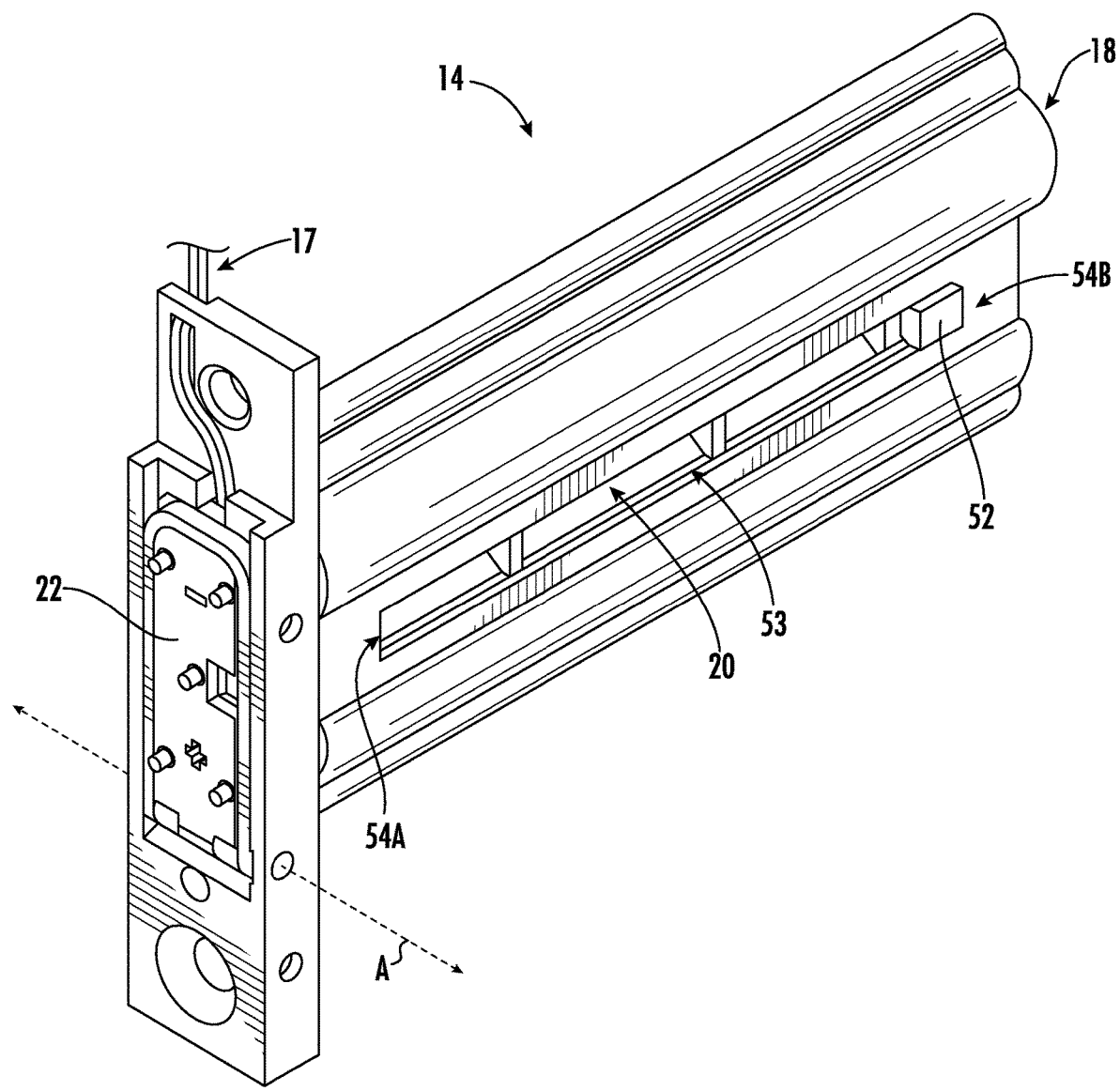
FIG. 2 is a perspective view of a battery storage system of FIG. 1, with a hinged door in a closed position.

FIG. 2 is a perspective view of the battery storage system 14, with the access door 16 having been removed. As shown in FIG. 2, the battery storage system 14 includes a battery housing 18 that at least partially defines a cavity 20 for storing batteries that power the electronic mortise lock 12. Wires 17 electrically connect the batteries (not shown in FIG. 2) to the electronic mortise lock 12.

A hinged door 22 is provided, and is depicted in a closed position in FIG. 2. The hinged door 22 rotates about an axis A between the closed position, shown in FIG. 2, and an open position, as shown in FIG. 3.

Figure 3:
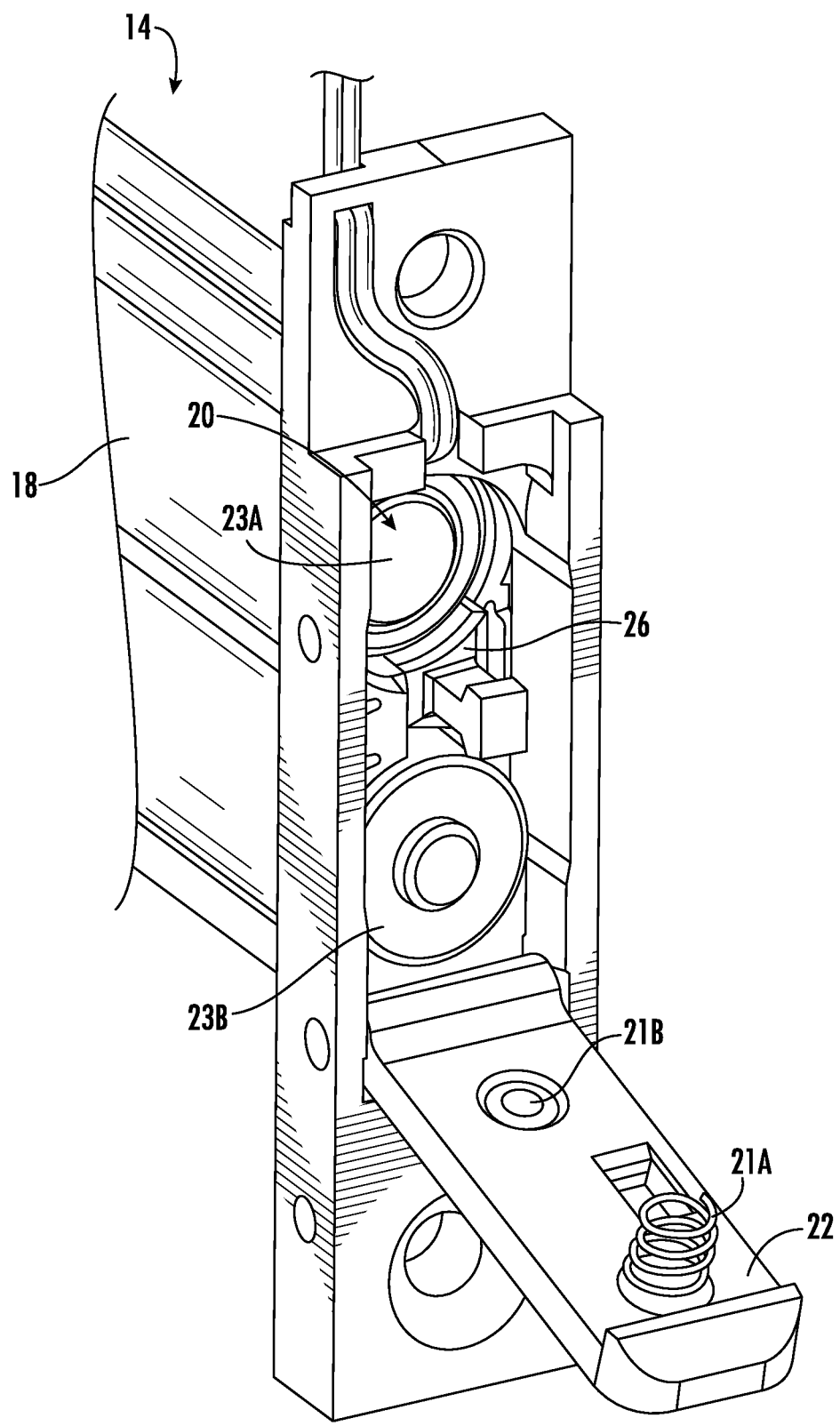
FIG. 3 is a perspective view of the battery storage system of FIG. 2 with the hinged door in an open position.

FIG. 3 is a perspective view of the battery storage system 14 with the hinged door 22 in an open position, which provides access to batteries 23A and 23B within the battery housing 18. Electrical contacts 21A-B are provided for providing an electrical connection between the batteries 23A-B when the hinged door 22 is in the closed position. A battery carrier 26 is provided for removing the batteries 23A-B (and batteries 23C-D, not shown in FIG. 3) from the battery housing 18 and inserting the batteries 23A-D into the battery housing 18.

In FIG. 3, the battery carrier 26 is depicted in a battery storage position in which the batteries 23 and battery carrier 26 are stored within the cavity 20 of the battery housing 18. The battery carrier 26 is movable relative to the battery housing 18 between the battery storage position and a battery removal position, shown in FIG. 4, in which the batteries 23A-D are easily removable. When the hinged door 22 is in the open position, the battery carrier 26 can advance to the battery removal position. When the hinged door 22 is in the closed position, movement of the battery carrier 26 is limited, and the battery carrier 26 cannot advance to the battery removal position.

Figure 4:
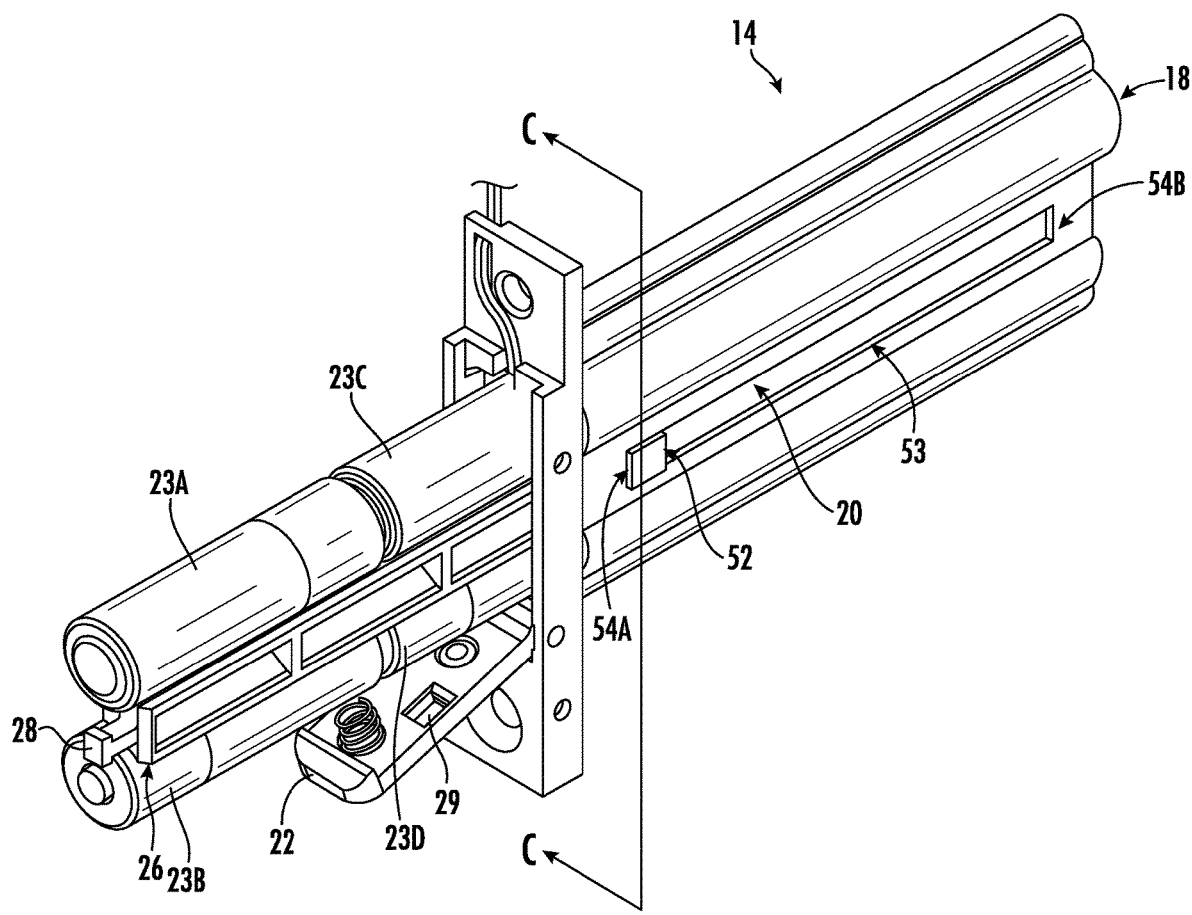
FIG. 4 is a perspective view the battery storage system of FIG. 2.

FIG. 4 is a perspective view the battery storage system 14 with the hinged door 22 in an open position, and the battery carrier 26 in the battery removal position. As shown in FIG. 4, in the battery removal position, the battery carrier 26 extends outside of the cavity 20. In the example of FIG. 4, a majority of the battery carrier 26 is outside of the battery housing 18 and cavity 20 in the battery removal position. The batteries 23A-D can be easily removed, replaced, and/or inserted in the battery removal position.

A T-shaped handle 28 is provided at an end portion of the battery carrier 26 for translating the battery carrier 26 between the battery storage position and the battery removal position. The hinged door 22 includes an opening 29, and when the hinged door 22 is in the closed position, the T-shaped handle 28 extends at least partially into the opening 29.

Figure 5:
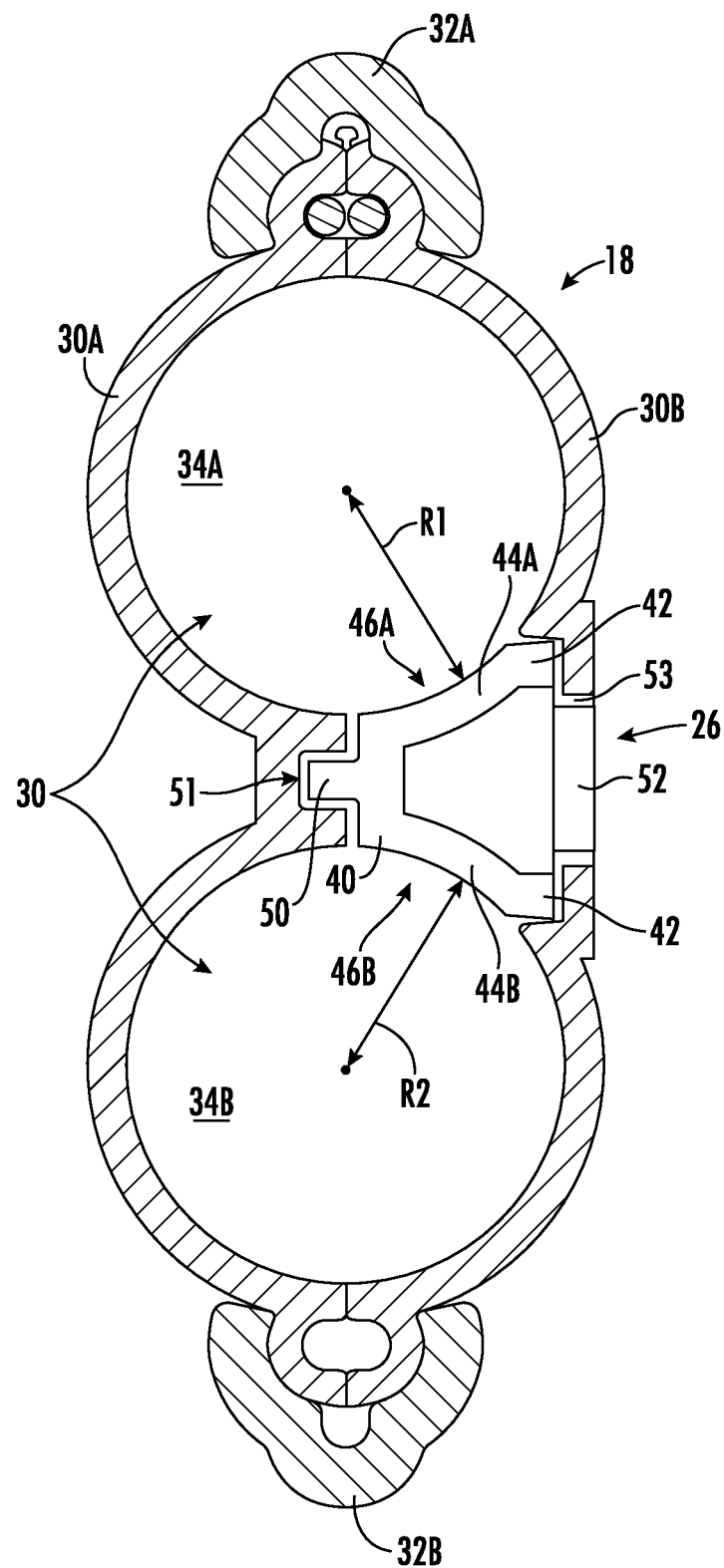
FIG. 5 is cross-sectional view of a battery housing of the battery storage system of FIG. 2, taken along line C-C in FIG. 4.

FIG. 5 is a cross-sectional view of the battery housing 18 taken along line C-C of FIG. 4, but with the batteries 23 not shown. As shown in FIG. 5, the battery housing 18 includes two exterior walls 30A-B that are secured together by clamping members 32A-B. The cavity 20 is provided between the exterior walls 30A-B, and includes a first battery storage area 34A for storing batteries 23A, 23C, and a second battery storage area 34B for storing batteries 23B, 23D. In the closed position, the battery carrier 26 is provided between the two battery storage areas 34A-B.

The battery carrier 26 includes a first wall 40 and a second wall 42 that is opposite the first wall 40. First and second sloped walls 44A-B are provided that are disposed on opposing sides of the first wall 40. Each sloped wall 44 has a convex geometry and is sloped inwardly from a respective side of the first wall 40 to the second wall 42. The first sloped wall 44A has a radius of curvature R1, and the second sloped wall 44A has a radius of curvature R2. In the example of FIG. 5, the R1 and R2 are substantially the same.

The first sloped wall 44A at least partially defines a battery recess 46A that is dimensioned to at least partially receive the batteries 23A, 23C. In a similar fashion, the second sloped wall 44B at least partially defines a battery recess 46B that is dimensioned to at least partially receive the batteries 23B, 23D.

The battery carrier 26 includes a first carrier guide feature and a second carrier guide feature which each engage a respective housing guide feature of the battery housing 18 to support movement of the battery carrier 26 between the battery storage position and the battery removal position. The guide features also provide for alignment of the battery carrier 26 with respect to the battery housing 18 as the battery carrier 26 it moves between the battery storage position and the battery removal position.

In the example of FIG. 5, the first carrier guide feature is a ridge 50 that extends outward from the first wall 40 and is received into a slot 51 in the exterior wall 30A. The ridge 50 is slidable in the slot 51 between the battery storage position and the battery removal position. The second carrier guide feature includes a tab 52 that extends outward from the second wall 42 and engages a slot 53 in the exterior wall 30B.

Referring again to FIGS. 2 and 4, the slot 53 extends between a first end 54A and a second end 54B. The first end 54A of the slot 53 limits movement of the battery carrier 26 in the battery removal position (see FIG. 4), and the second end 54B of the slot 53 limits movement of the battery carrier 26 in the battery storage position (see FIG. 2).

In an alternative embodiment, the ridge 50 and slot 51 could be switched so that the ridge 50 is part of the exterior wall 30A and the slot 51 is part of the first wall 40.

Figure 6:
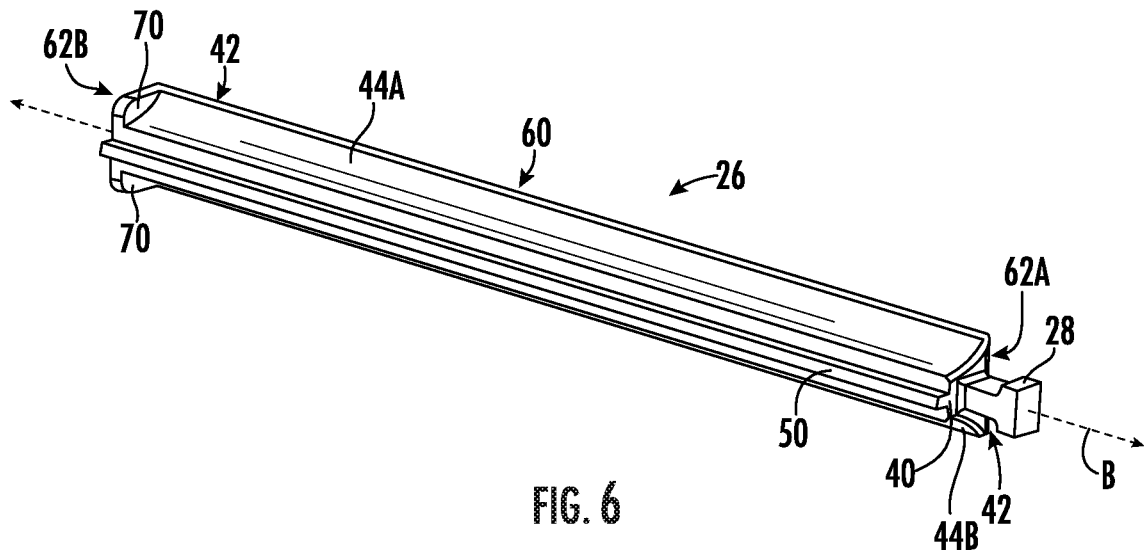
FIG. 6 is perspective view of a battery carrier of the battery storage system of FIG. 3.

FIG. 6 is perspective view of the batter carrier 26. As shown in FIG. 6, the battery carrier 26 has an elongated body 60 that extends longitudinally along a central longitudinal axis B between a first end portion 62A and a second end portion 62B. The first and second sloped walls 44A-B and ridge 50 also extend longitudinally between the first end portion 62A and the second end portion 62B. The T-shaped handle 28 extends outwards from the first end portion 62A. The batteries 23A-D extend generally parallel to the central longitudinal axis B.

A battery retention wall 70 is disposed at the second end portion 62B, and extends outwardly from the second wall 42 in a direction generally perpendicular to the central longitudinal axis B. As shown in FIG. 6, the first and second sloped walls 44A-B terminate at the battery retention wall 70, such that the battery retention wall 70 also partially defines the battery recesses 46A-B. The battery retention wall 70 prevents batteries in the battery recesses 46A-B from extending beyond the second end portion 62B.

Figure 7:
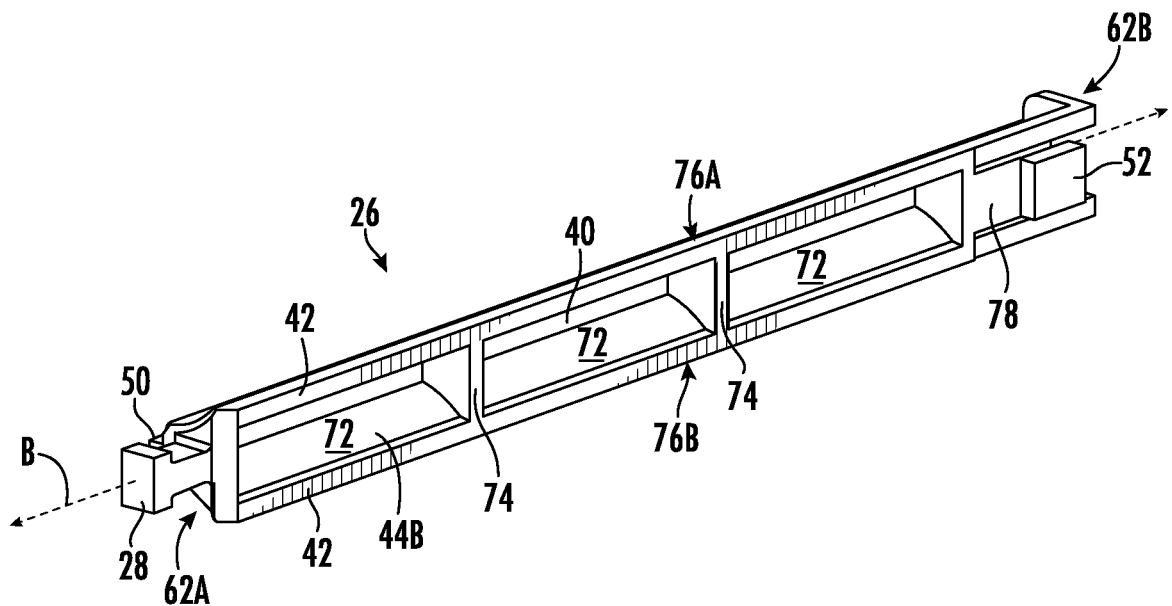
FIG. 7 is another perspective view of the battery carrier of FIG. 6.

FIG. 7 is another perspective view of the batter carrier 26. As shown in FIG. 7, the second wall 42 includes a plurality of cavities 72 that are coaxial, extend along the central longitudinal axis B, and are disposed between the first end portion 62A and second end portion 62B. A plurality of support ribs 74 separate the plurality of cavities 72 and extend between edges 76A-B of the second wall 42.

The tab 52, which is receivable into the slot 53, is shown in FIG. 7. A tongue 78 provides a bias force that biases the tab 52 outwardly from the second wall 42. The tongue 78 can be flexed inward towards the first wall 40 for initial insertion of the tab 52 into the slot 53, and for removal of the tab 52 from the slot 53 (e.g., so that the battery carrier 26 can extend beyond the battery removal position for complete removal of the battery carrier 26 from the cavity 20 of the battery housing 18).

Figure 8:
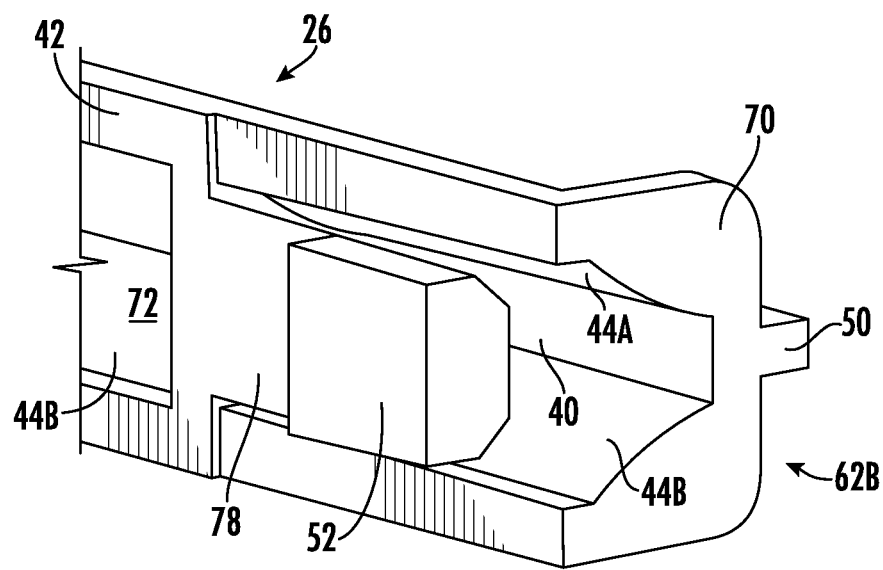
FIG. 8 is a perspective view of an end portion of the battery carrier of FIG. 6.

FIG. 8 is perspective view of the second end portion 62B of the battery carrier 26 which shows the tab 52 and tongue 78 in greater detail.

Figure 9:
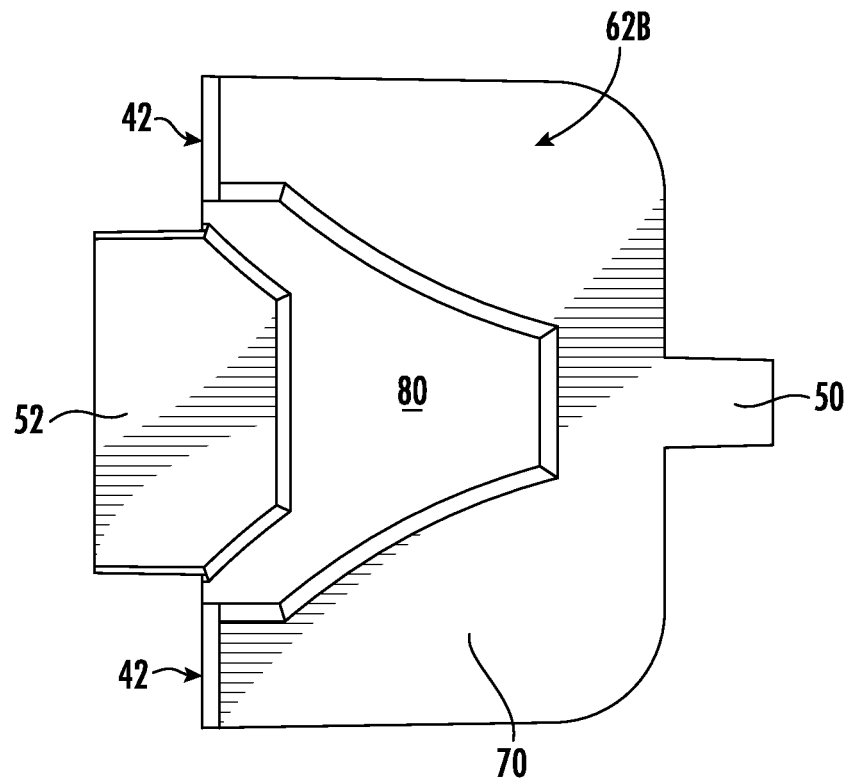
FIG. 9 is an end view of the battery carrier of FIG. 6.

FIG. 9 is an end view of the battery carrier 26 that shows the second end portion 62B, and illustrates a recess 80 in the battery carrier 26 that accommodates inward flexing of the tab 52 and tongue 78 towards the first wall.

Electronic mortise locks generally require a plurality of batteries. Unlike typical prior art electronic mortise locks, which have located a battery pack on the exterior of a door, the battery storage system 14 provides for convenient storage of the batteries 23A-D within the second door mortise 13B.

Excessively large door mortises are undesirable because they can weaken the structure of a door. The small footprint of the battery storage system 14 avoids any substantial weakening of the door 11, while also providing for convenient insertion, removal, and replacement of the batteries 23A-D without requiring any complex external tools.

Also, by separating the second door mortise 13B, which houses the battery storage system 14, from the first door mortise 13A, which houses the electronic mortise lock 12, a greater degree of structural strength of the door 11 is maintained.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A battery carrier, comprising:
   an elongated body including opposing first and second walls that extend longitudinally between a first end portion and a second end portion of the elongated body;
   a handle extending outwards from the first end portion; and
   first and second sloped walls that extend between the first and second end portions and at least partially define respective battery recesses, each sloped wall sloped inwardly from a respective side of the first wall to the second wall.

2. The battery carrier of claim 1, comprising:
   a battery retention wall disposed at the second end portion and extending outwardly from the second wall in a direction generally perpendicular to a central longitudinal axis of the elongated body.

3. The battery carrier of claim 2, wherein the first and second sloped walls terminate at the battery retention wall.

4. The battery carrier of claim 1, comprising:
   a first guide feature extending outwardly from the first wall; and
   a second guide feature extending outwardly from the second wall.

5. The battery carrier of claim 4, wherein the first guide feature comprises a ridge that extends outward from the first wall and extends longitudinally between the first end portion and second end portion.

6. The battery carrier of claim 4, wherein the second guide feature comprises a tab, a flexible tongue biasing the tab outwardly from the second wall.

7. The battery carrier of claim 1, wherein the second wall comprises:
   a plurality of cavities that are coaxial and are disposed between the first end portion and second end portion; and
   a plurality of support ribs that separate the plurality of cavities.

8. The battery carrier of claim 1, wherein the handle is T-shaped.

9. The battery carrier of claim 1, wherein a radius of curvature of the first and second sloped walls is approximately the same.

10. The battery carrier of claim 1, wherein the first battery recess and second battery recesses are each dimensioned to at least partially receive at least one cylindrical battery.

11. A battery storage system, comprising:
   a battery housing at least partially defining a cavity that includes a first battery storage area and a second battery storage area; and
   a battery carrier that is moveable relative to the battery housing between a battery storage position, in which the battery carrier is disposed within the cavity and between the first and second battery storage areas, and a battery removal position in which the battery carrier extends outside of the cavity, the battery carrier comprising:
      an elongated body including opposing first and second walls that extend longitudinally between a first end portion and a second end portion of the elongated body;
      a handle extending outwards from the first end portion; and
      first and second sloped walls that extend between the first and second end portions and at least partially define respective battery recesses, each sloped wall sloped inwardly from a respective side of the first wall to the second wall.

12. The battery storage system of claim 11, comprising:
a battery retention wall disposed at the second end portion and extending outwardly from the second wall in a direction generally perpendicular to a central longitudinal axis of the elongated body.

13. The battery storage system of claim 12, wherein the first and second sloped walls terminate at the battery retention wall.

14. The battery storage system of claim 11, comprising:
a carrier guide feature of the first wall or second wall that engages a housing guide feature of the housing to support movement of the battery carrier between the battery storage position and the battery removal position.

15. The battery storage system of claim 14, wherein:
the carrier guide feature comprises a ridge that extends outward from the first wall; and
the housing guide feature comprises a slot that receives the ridge, wherein the ridge is slidable in the slot between the battery storage position and the battery removal position.

16. The battery storage system of claim 14, wherein:
the carrier guide feature comprises a tab, a flexible tongue biasing the tab outwardly from the second wall; and
the housing guide feature comprises a slot that receives the tab and extends between a first end and a second end, the first end of the slot limiting movement of the carrier in the battery removal position.

17. The battery storage system of claim 11, wherein the second wall comprises:
a plurality of cavities that are coaxial and are disposed between the first end portion and second end portion; and
a plurality of support ribs that separate the plurality of cavities.

18. The battery storage system of claim 11, wherein the handle is T-shaped.

19. The battery storage system of claim 11, wherein a radius of curvature of the each of the sloped walls is approximately the same.

20. The battery storage system of claim 11, comprising:
a hinged door that is rotatable between an open position which enables the battery carrier to advance to the battery removal position, and a closed position that prevents the battery carrier from advancing to the battery removal position.

* * * * *